United States Patent [19]
Gillett

[11] Patent Number: 5,627,837
[45] Date of Patent: May 6, 1997

[54] APPARATUS AND METHOD FOR SUPPRESSING PROTECTION SWITCHING IN A DIGITAL COMMUNICATION SYSTEM IN THE EVENT OF AN ERROR BURST

[75] Inventor: Mark D. Gillett, Richardson, Tex.

[73] Assignee: Alcatel Network Systems, Inc., Richardson, Tex.

[21] Appl. No.: 294,388

[22] Filed: Aug. 23, 1994

[51] Int. Cl.$^6$ ................................................ G06F 11/00
[52] U.S. Cl. ........................... 371/5.5; 371/5.1; 370/217
[58] Field of Search ....................... 371/5.5, 5.1, 20.1, 371/38.1, 39.1, 25.1, 21.4; 370/13, 14, 15, 16, 17

[56] References Cited

U.S. PATENT DOCUMENTS

| | | | |
|---|---|---|---|
| 5,159,665 | 10/1992 | Priem et al. | 395/134 |
| 5,271,011 | 12/1993 | McMullan et al. | 371/5.3 |
| 5,329,520 | 7/1994 | Richardson | 370/16 |

Primary Examiner—Hoa T. Nguyen
Assistant Examiner—Phung My Chung
Attorney, Agent, or Firm—Vinson & Elkins L.L.P.

[57] ABSTRACT

A method and system for performing protection switching in a communications system is disclosed. The disclosed system and method include the ability to detect bit error burst conditions, in which data is highly errored over a brief time and responsive to which the protection switching procedure is not desired. The number of bit errors over a series of sample periods are counted, and the number of errors detected in each sample period is compared against a burst error threshold. A carryover value from the prior sample period (e.g., the number of detected errors above average) is preferably added to the detected errors in the current sample period prior to the comparison, so that error bursts are detected regardless of their alignment with the sample periods. Upon detection of a burst condition, the number of errors for the current sample period is reduced to the running average of errors for the preceding sample periods in a detection window, prior to comparing the errors detected over the detection window against a protection switching error threshold value.

15 Claims, 5 Drawing Sheets

APPARATUS AND METHOD FOR SUPPRESSING PROTECTION SWITCHING IN A DIGITAL COMMUNICATION SYSTEM IN THE EVENT OF AN ERROR BURST

FIELD OF THE INVENTION

This invention is in the field of digital communications systems, and is more particularly directed to the detection of errors in digital transmission and the control of protection switching in such systems.

BACKGROUND OF THE INVENTION

As is well known in the art, significant advances have been made in telecommunications systems over recent years, particularly in the rate at which information can be communicated. For example, conventional digital telecommunications systems provide extremely high bandwidth, such as the 44.736 Mbps data rate provided by the DS-3 data frame standard. Fiber optic-based systems can provide even higher bandwidth and data rates by way of time-division multiplexing of up to twelve DS-3 lines, resulting in bandwidth of up to 536.8 Mbps.

These extremely high bandwidth now available in digital telecommunications systems have enabled the communication of large volumes of data at high speeds. As a result, digital data is now commonly communicated from computer-to-computer. However, while digital voice transmissions can tolerate a significant amount of errors before the message is audibly distorted, each bit in a digital data transmission has significance. As such, high reliability and high quality transmission is necessary for the successful transmission of digital computer data. From the standpoint of the telecommunications provider, higher tariffs may be charged for those customers who require high quality digital transmission, with the level of quality defined by a bit error ratio limit (i.e., number of errored bits over the number of total bits transmitted).

Conventional digital communications systems provide such high quality transmission by switching between redundant facility paths in response to "performance monitoring" (commonly referred to as "PM") of the transmitted signal. The bit error ratio of received digital data is monitored, for example by way of cyclic redundancy check (CRC) and other conventional coding techniques; upon the monitoring process detecting a failure condition, the system either indicates an alarm to an operator or automatically switches the transmission. Performance monitoring and protection switching thus allows the telecommunications provider to ensure the desired grade of service desired by those customers paying premium tariffs for high quality and low error rate communications.

Failure conditions that are used to effect protection switching include "hard" failures, such as loss-of-signal ("LOS"), loss-of-frame ("LOF"), excessive bit error ratio ("excessive BER"), or alarm indication signal ("AIS"). Conventional fiber-optic terminals (FOTs) with 1:1 redundancy for the fiber optic lines in a system use these hard failures to automatically switch its transmission to the other of the two fiber optic lines responsive to receiving such hard failure indications.

However, many conditions other than hard failure conditions are also unacceptable to the telecommunication customer that is demanding high quality communication, particularly where computer data is to be transmitted and received. These other conditions may not be of such degree as to cause total loss of communication, but instead may degrade the quality of communication to an unacceptable extent. These other conditions include "soft" failures in which a particular signal has experienced a high bit error ratio. U.S. Pat. No. 5,329,520, issued Jul. 12, 1994, assigned to Alcatel Network Systems, Inc. and incorporated herein by this reference, describes a system that detects the number of bit errors over time, and that effects protection switching responsive to the detected bit error ratio exceeding certain thresholds.

As is well known in the art, protection switching is required to complete within a certain short period of time, (e.g., within 60 msec from the start of most failure conditions, according to certain industry standards), in order for the facility to be considered of sufficiently high quality as to bear an increased tariff. The above-incorporated U.S. Pat. No. 5,329,520 describes certain techniques for providing such rapid switching in the event of both hard and soft failure conditions.

Certain transient physical conditions are known to produce a heavily errored condition for a brief period of time, following which the transmission is again free from errors. These errored conditions are commonly referred to as "error bursts", or simply as "bursts". It has been observed that many bursts have a duration that is shorter than the time required for effecting protection switching. For those instances where such a short burst occurs, therefore, conventional bit-error-ratio protection switching techniques will introduce more error into the transmission from the lost traffic during the switching time, than is present due to the burst. The quality of service provided is therefore degraded by the protection switching from that which the transmission would have provided without the switching, even considering the burst.

It is therefore an object of the present invention to provide an apparatus and method for detecting burst conditions in a digital communications system.

It is a further object of the present invention to provide such an apparatus and method that suppresses protection switching responsive to detection of a burst condition.

It is a further object of the present invention to provide such an apparatus and method that detects such burst conditions in a manner that is independent of the alignment of the sample period with the burst.

Other objects and advantages of the present invention will be apparent to those of ordinary skill in the art having reference to the following specification together with its drawings.

SUMMARY OF THE INVENTION

The invention may be implemented into a programmable network element in a digital communications system. Bit error detection is performed, for each incoming facility, by way of an error counter. A controller in the programmable network element counts the number of errors detected over a sample period of time and compares the counted errors to a burst error threshold value to determine if an error burst may have occurred during the sample period. Preferably, the number of errors above a running average in the preceding period (i.e., the "carryover") are added to the number of errors detected in the present sample period, with the sum compared to the threshold value; this ensures that bursts are detected regardless of their timing relative to the beginning of the sample period. If a burst is detected, the carryover is compared against a selected fraction of the burst error threshold to determine if the burst should be considered to have begun in the previous sample period rather than the current sample period. For a sample period in which a burst has been detected, the number of errors is reduced to the average of several preceding periods within a sliding time window over which the error ratio is being calculated. The total number of errors over the detection window is then compared to a protection switching error threshold, responsive to which protection switching will occur if the threshold is exceeded. The number of sample periods for which error bursts are averaged down (i.e., suppressed) may be as low as one, or may be selected to be greater than one, depending upon the extent to which error bursts are not to be considered in the protection switching decision.

DETAILED DESCRIPTION OF THE PREFERRED EMBODIMENT

Figure 1A:
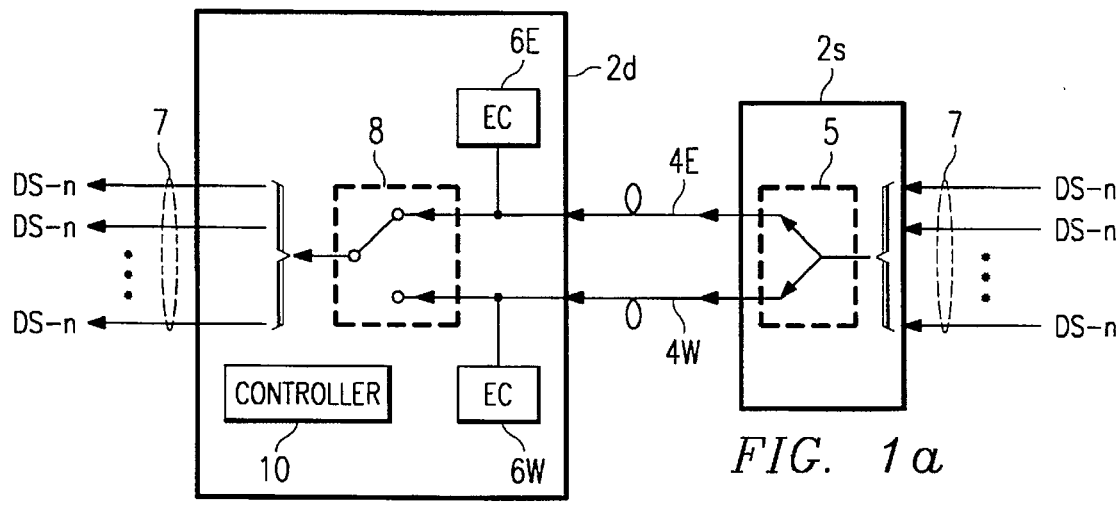
FIGS. 1a and 1b schematically illustrate the construction and operation of a portion of a "1+1" digital communications network in which a network element (NE) according to the preferred embodiment of the invention is implemented.
Figure 1B:
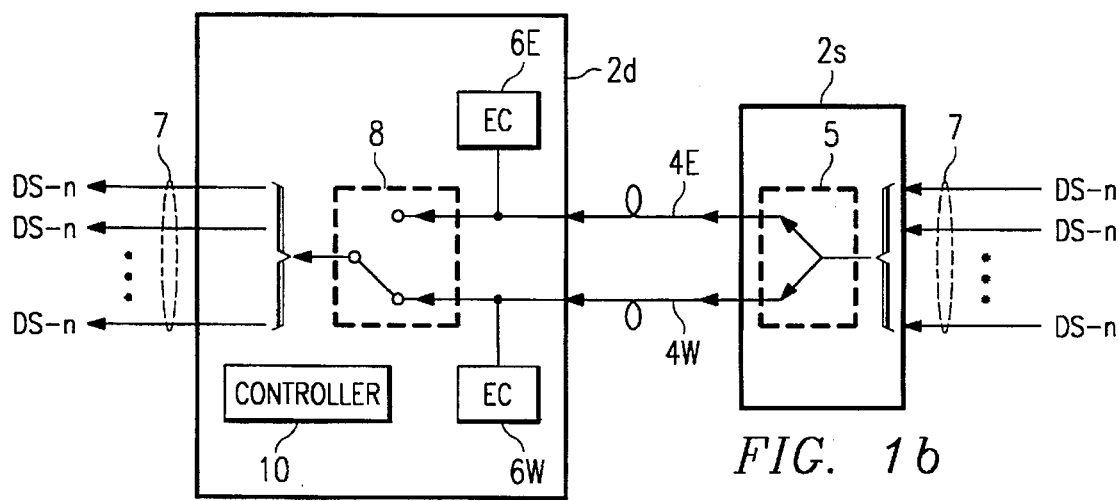

Referring now to FIGS. 1a and 1b, a portion of a digital communications network incorporating the preferred embodiment of the invention will now be described. The portion of the network illustrated in FIGS. 1a and 1b is only that portion between two network elements (NEs) 2s, 2d. As is well known in the art, the term "network element" generically refers to any one of several types of equipment present upon a digital communications network, including add/drop multiplexers, digital cross-connects, and fiber-optic terminals (FOTs), and the like.

In the example of FIGS. 1a and 1b, NEs 2s, 2d correspond to FOTs, in that each of NEs 2s, 2d are connected on one side to conventional coaxial communications lines 7 carrying time-division multiplexed signals, and are connected on another side to fiber optic cables 4 carrying multiplexed digital communications according to a conventional standard such as the SONET standard. The capacity of coaxial lines 7 is commonly referred to as of a particular DS-n data frame standard, and the capacity of fiber optic cables 4 is commonly referred to as of a particular OC-m data frame standard. For example, as is well known in the art, a typical modern fiber optic cable carrying OC-12 data frames is approximately the same capacity as twelve coaxial lines carrying DS-3 data frames.

Also in this example, for ease of explanation, the relationship between NEs, or FOTs, 2s and 2d is referred to as a unidirectional type, in that traffic is shown as traveling from FOT 2s to FOT 2d in a single direction. Of course, it will be appreciated by those of ordinary skill in the art that the present invention is also applicable to other arrangements, such as bidirectional communication between FOTs 2s, 2d over the fiber optic cables 4.

The configuration shown in FIGS. 1a and 1b incorporates protection switching of the type commonly referred to as "1+1" protection. According to this protection configuration, FOT 2s, which is the source of the traffic in this example, receives incoming traffic from its associated coaxial DS-n lines 7 and formats the traffic as required by the SONET standard. Switch 5, internal to FOT 2s, presents the traffic from the input DS-n lines 7 identically onto both of fiber optic cables 4E and 4W. As such, fiber optic cables 4E, 4W carry identical traffic relative to one another (to the extent the traffic presented thereupon is solely that driven by FOT 2s). This arrangement provided by FOT 2s is commonly referred to as a "head-end bridge".

On the receiving end of this traffic, FOT 2d is the destination of the traffic carried on fiber optic cables 4E, 4W. FOT 2d receives this traffic and, via its internal switch 8 under the control of programmable controller 10, presents the traffic from a selected one of fiber optic cables 4E, 4W onto DS-n coaxial lines 7. According to the 1+1 protection scheme, one of the fiber optic cables 4E, 4W is designated as the primary line; in the example of FIG. 1a, 1b, the primary line is fiber optic cable 4E, such that, in the normal operating state prior to protection switching, switch 8 communicates the traffic from fiber optic cable 4E onto coaxial DS-n lines 7. The other fiber optic cable, cable 4W in this example, thus serves as the backup line for the 1+1 protection scheme.

Programmable controller 10 may be of conventional construction for network elements, such as FOT 2d, provided that it have suitable computational power and capacity to perform the operations described herein. An example of programmable controller 10 suitable for use with the present invention is the model MC 68331 processor manufactured and sold by Motorola, which serves as the controller circuitry provided within the 1648 SM FOTs manufactured and sold by Alcatel Network Systems, Inc.

FOT 2d also includes error counters 6E, 6W, each connected to monitor the traffic received upon a respective one of fiber optic cables 4E, 4W. Error counters 6E, 6W are of conventional construction for performing bit error detection according to conventional techniques such as the BIP8 (8-bit bit interleaved parity) technique defined according to the SONET standard. As such, error counters 6E, 6W detect parity errors in the incoming traffic over time, for periodic interrogation by controller 10 in the manner described in detail hereinbelow.

In the 1+1 protection switching scheme of FIGS. 1a and 1b according to the preferred embodiment of the invention, protection switching occurs upon error counter 6E detecting errors at a ratio, as determined by controller 10, in excess of a predetermined threshold. During this time, controller 10 is also periodically interrogating error counter 6W to determine the error ratio of traffic received from redundant fiber optic cable 4W. Upon the error ratio of the traffic received from fiber optic cable 4E exceeding the threshold (and assuming the error ratio of traffic received from fiber optic cable 4W is acceptably low), controller 10 causes switch 8 to couple coaxial DS-n lines 7 to the redundant fiber optic cable 4W, resulting in the configuration of FIG. 1b. After the switch, coaxial DS-n lines 7 at FOT 2d will receive traffic from fiber optic cable 4W, as shown in FIG. 1b.

According to current industry standards, and as described in the above-incorporated U.S. Pat. No. 5,329,520, the switch performed at FOT 2d from receiving traffic from fiber optic cable 4E to receiving traffic from fiber optic cable 4W in the 1+1 protection scheme of FIGS. 1a and 1b must occur within a time period of as little as 60 msec. This specified switching time is generally measured from the beginning of the failure condition causing the switch, which means that the steps of detecting the failure condition, deciding to switch, and effecting the switch must all take place within the specified (e.g., 60 msec) time period.

As noted above, however, certain failure conditions are of a "burst" type, in that a heavily errored condition exists for a very brief period of time. For example, traffic may be totally errored for a period on the order of 20 msec, after which the traffic is again error free. In this example, it is undesirable to effect a protection switch, since the time required to make the switch may exceed the duration of the errored condition. According to the present invention, however, FOT 2d detects the existence of such failure conditions, and suppresses the making of a protection switch.

Figure 2:
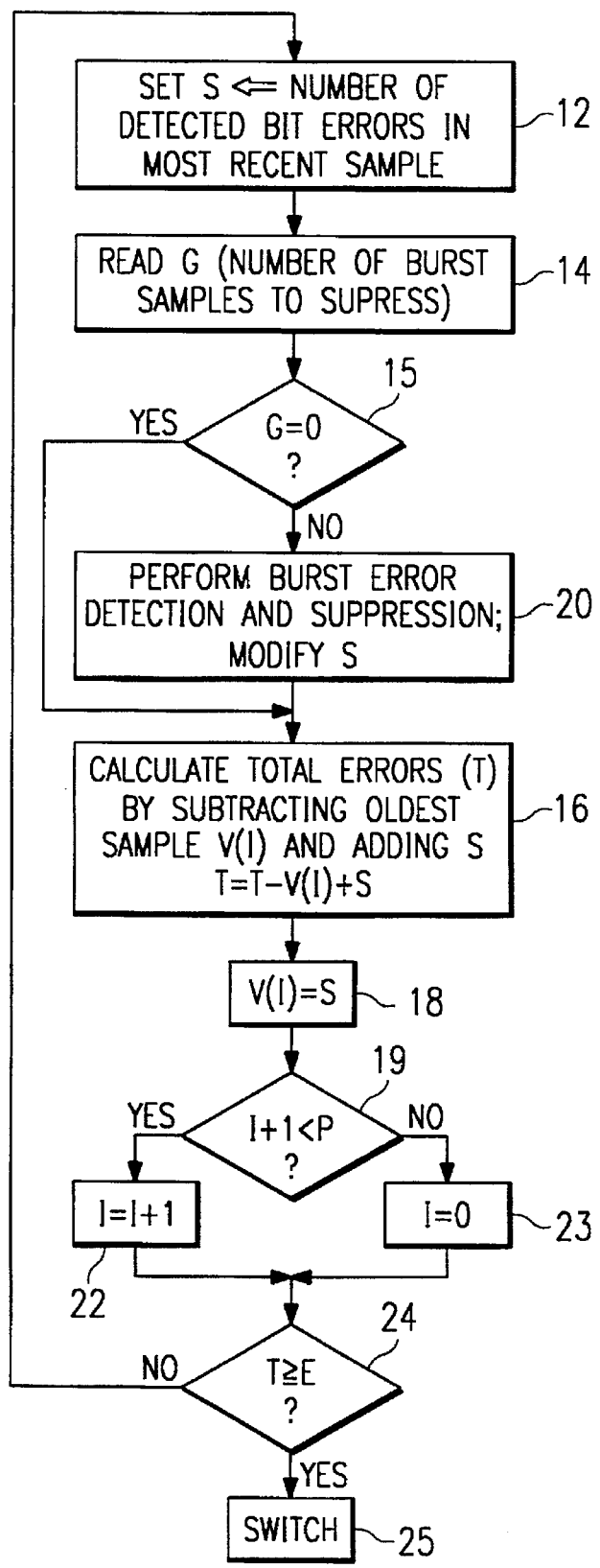
FIG. 2 is a flow chart illustrating a method of effecting protection switching according to the preferred embodiment of the invention.

Referring now to FIG. 2, the operation of controller 10 in monitoring bit errors, and in effecting a protection switch operation responsive thereto, according to the preferred embodiment of the invention will now be described.

According to this embodiment of the invention, error counter 6E is sampled on a periodic basis to determine the number of bit errors detected over the most recent sample period. The bit error ratio is then determined by determining the number of bit errors detected over a selected number of the most recent sample periods and calculating the error ratio. The number of successive sample periods over which the error ratio is calculated will be referred to herein as the detection window.

The duration of the detection window (and thus the number of sample periods within the detection window) will depend upon the data rate of the traffic monitored, and also upon the desired bit error ratio threshold for protection switching. For example, if the monitored traffic is received according to the OC-48 data frame standard (i.e., a data rate of approximately 2.448 Gbps) and if the desired bit error ratio threshold for protection switching is 1E-6, the SONET standard suggests an average detection time of 62.5 msec with a switching threshold of 154 errors. According to the present invention, an example of the detection window is 60 msec, comprised of six sample periods of 10 msec each. The error threshold for 60 msec will thus be 148 errors over the 60 msec detection window; accordingly, protection switching will occur responsive to 148 or more errors being detected over the six most recent sample periods.

For purposes of this example, a burst will be considered to be possibly present in any 10 msec sample period that contains 16032 or more errors. This instantaneous error ratio of 1E-3 is, of course, far in excess of the specification error ratio of 1E-6 in this example. However, if the duration of the errored condition is sufficiently short (e.g., confined to a 10 msec period), it would be inefficient to perform the protection switching; this embodiment of the invention is intended to detect such short periods of errored conditions and to suppress the protection switching in that event.

Referring back to FIG. 2, therefore, according to this embodiment of the invention controller 10 interrogates error counter 6E in process 12, to read the number of bit errors detected during the last sample period (e.g., 10 msec period), and sets the value S (stored in a memory location or in a register) with the number of detected bit errors. In process 14 and decision 15, controller 10 determines if burst suppression has been enabled by reading from memory a value G, corresponding to the number of successive sample periods for which bursts are to be suppressed. If G equals 0, burst suppression is disabled, and control passes to process 16. If G is non-zero (i.e., one or greater), burst suppression is enabled and control of the method passes to process 20.

According to this embodiment of the invention, burst suppression in process 20 is performed, in the event that a possible burst event is detected, by modifying the value S for the most recent sample period. The error burst detection and suppression of process 20 according to the preferred embodiment of the invention will be described below in more detail. For purposes of this general description of the overall process of FIG. 2, process 20 determines if a sample period possibly contains a burst condition, in which case its value S will be reduced to the average error rate for the preceding sample periods within the detection window, prior to its application to process 16. In this way, if an errored condition is resolved quickly, an excessive high error ratio within a single sample period will not cause protection switching. In contrast, if burst suppression is not enabled, the value S for the most recent sample period is not modified and remains at its raw value as detected by error counter 6E.

In process 16, controller 10 calculates the total errors for the current detection window, using the value S (raw or modified) corresponding to the number of errors detected in the most recent sample period, and using the number of errors in the preceding sample periods that are within the detection window. In this example of the invention, process 16 is performed using a circular buffer, referred to herein as an array V of dimension P, where P is the number of sample periods within the detection window. In the particular example described above, where a 60 msec detection window is comprised of six 10 msec sample periods, P will equal 6. In process 16, the total number of errors (T) in the detection window is thus determined by subtracting the entry V(I) in array V from T, where I points to the oldest sample period, and by adding the value S for the current sample period to the remainder. Process 18 is then performed, by way of which the value S for the current sample period is written into the entry V(I) to discard the entry from the oldest sample period in the detection window. Decision 19 and processes 22, 23 update index I for the circular buffer array V, by determining if an incremented value I+1 is less than the value P (number of sample periods in the detection window) and by either incrementing the index (I=I+1, process 22) or resetting the index to zero (process 23) depending upon the result of decision 19.

Decision 24 then compares the new total value T, which is the number of bit errors detected over the new detection window that includes the most recent sample period to an error threshold value E; the value E corresponds to the minimum number of detected errors over the detection window necessary to effect protection switching. As noted above, if burst suppression has been enabled (G>0), the value T may be modified from its raw value, by modification of the value S for the most recent sample period if a burst is detected. If the value T meets or exceeds the error threshold E for the detection window (in this example, meets or exceeds 148 errors over 60 msec), process 25 is initiated in which controller 10 causes switch 8 to switch its reception from fiber optic cable 6E to fiber optic cable 6W. If the error threshold E is not exceeded by this new value of T, control passes back to process 12 in which the error count for the next sample period is retrieved from error counter 6E, and the process is repeated.

Figure 3:
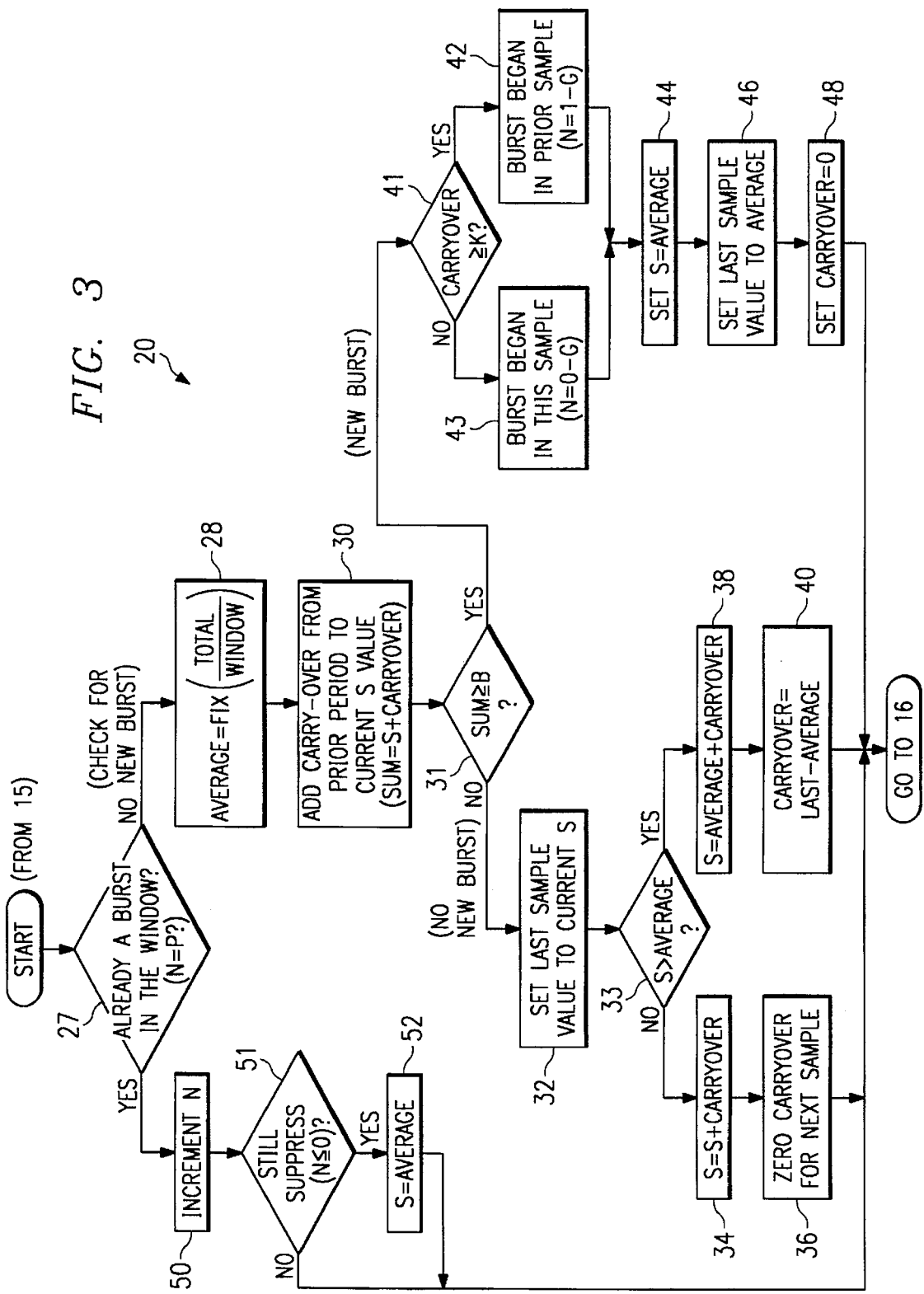
FIG. 3 is a flow chart illustrating the portion of the method of FIG. 2 in which burst events are detected and their effects suppressed from protection switching determination, according to the preferred embodiment of the invention.

Referring now to FIG. 3, the operation of process 20, in which error burst detection and suppression (i.e., modification of the value S for the current sample period) is performed according to the preferred embodiment of the invention will now be described in detail. Error burst detection and suppression process 20 begins with decision 27, in which controller 10 determines if a burst condition has already been detected within the current detection window (in this example, the current sample period plus the five immediately preceding sample periods). This is performed in this embodiment of the invention by comparing an index value N, which is set to a negative number upon detection of a burst condition, to the value P indicative of the number of sample periods within the detection window.

According to this embodiment of the invention, only a single burst condition is suppressed within the detection window. This means that a second "burst" condition (meaning that the sample is at least as bad as the burst error threshold) within the detection window is sufficient, by itself, to be treated as a true failure condition. Accordingly, in decision 27, if the value N does not equal the value P, a prior sample period within the detection window contained an error condition that exceeded the burst error threshold, and control passes to process 50 for processing, as will be described in detail hereinbelow. If the value N equals the value P, no prior sample period currently within the detection window contained a burst condition, and control passes to decision 28 to initiate the process for analyzing the current sample period to see if a burst may now have occurred.

Burst detection begins first by determining the average error rate for the prior detection window, not including the current sample period that was most recently sampled in process 12 of FIG. 2. In this example, process 28 calculates the value AVG as the truncated integer portion of the ratio of the current total errors T in the detection window, divided by the number P of sample periods within the detection window (in this example, as noted above, P=6). This average value AVG will be used as the S value for the current sample period if a burst is detected, as will be described hereinbelow.

Process 30 is next performed, in which a "carry-over" number of errors from the prior sample period is added to the S value for the current sample period. The preferred embodiment of the present invention utilizes this carry-over concept to avoid errors due to burst conditions not necessarily lining up with the sample period. For purposes of explanation of this concept, attention is directed to FIGS. 4a and 4b.

Figure 4A:
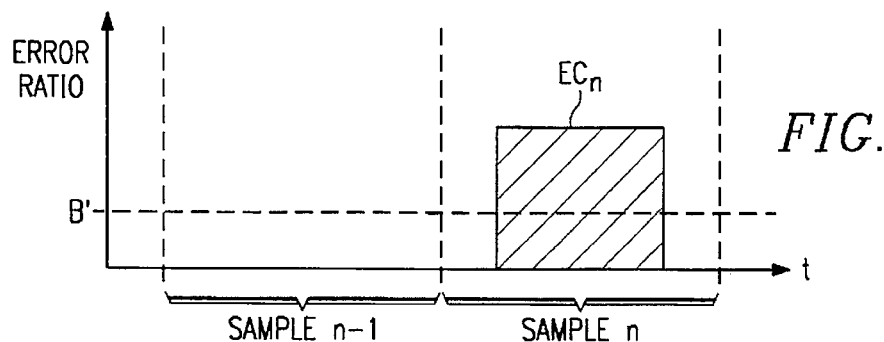
FIGS. 4a and 4b are timing diagrams illustrating two examples of the relationship of a burst condition to the beginning and end of adjacent sample periods.
Figure 4B:
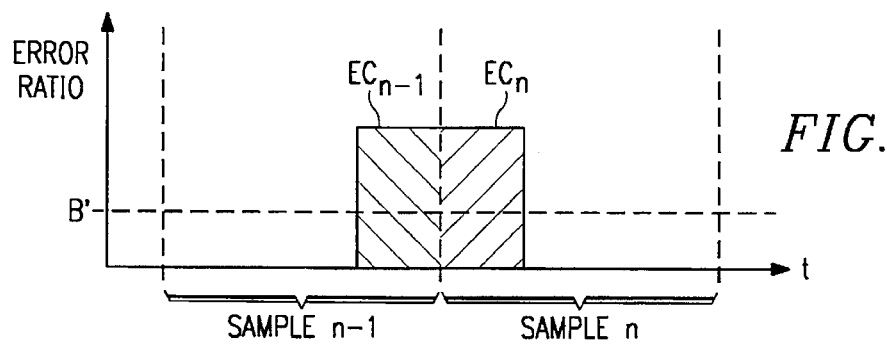

FIGS. 4a and 4b are error ratio versus time plots of the same brief error condition EC, but in which the time boundary between sample periods n−1 and n is shifted relative to the error condition. FIG. 4a illustrates a condition where errored condition $EC_n$ happens to occur fully within a single sample period n. In this case, the number of errors S due to errored condition $EC_n$ that are found within single sample period n (illustrated by the area under the curve $EC_n$ in FIG. 4a) exceeds the threshold number of errors B for determining a burst (i.e., burst threshold error ratio B' times the total bits transmitted over sample period n), and could be identified as a burst merely by comparing the value S for sample n to threshold B.

However, in the case of FIG. 4b, errored condition $EC_n$, $EC_{n-1}$ has the same error ratio and duration as that of errored condition $EC_n$ of FIG. 4a, but is approximately evenly split between sample period n−1 and sample period n. In this case, errored condition portion $EC_{n-1}$ that is within sample period n−1 has fewer errors than burst threshold B, and errored condition portion $EC_n$ that is within sample period n also has fewer errors than burst threshold B. In this case, the mere comparison of errors in each sample period with the burst threshold would not detect a burst condition. Rather, the number of errors in errored condition portions $EC_{n-1}$ and $EC_n$ would be added to one another in determining the total errors over the detection window, and would undoubtedly cause protection switching to occur which would be undesirable given the brief and confined nature of the errors.

According to this embodiment of the invention, a carryover value is calculated for the prior sample period if a burst condition was not detected for that prior sample period, in a manner that will be described in detail hereinbelow. This carryover value is added to the value S for the current sample period prior to determining whether a burst condition exists in the current sample period. This addition is performed in process 30 of FIG. 3.

Following the addition in process 30, the sum (i.e., current value S plus the carryover value) is compared against the burst error threshold B in decision 31. If this sum meets or exceeds the burst error threshold B, a possible burst condition is detected, and control passes to decision 41 for possible modification of the value S as will be described hereinbelow.

If the sum does not meet or exceed the burst error threshold B in decision 31, the current sample period does not contain a burst condition. Control then passes to process 32 to modify the value S for calculation of the total errors in the detection window, and to set the carryover value used with the next sample period.

Process 32 sets a value L, which indicates the error count for the most recent previous sample period, to equal the current raw value S (i.e., the number of errors actually detected for the current sample period). The current value S is then compared against the previously calculated average error value AVG in decision 33. If the current value S is equal to or below the average value AVG, process 34 adds the carryover value from the prior sample period to the value S for the current sample period, and loads this sum into the memory location or register for the value S. This new value for the value S (the raw number of errors in the current sample period plus the carryover value from the prior period) is used in the total error calculation of process 16 of FIG. 2, as described above. The carryover value is then set to zero for processing of the next sample period, and control passes to process 16 (FIG. 2) for determination of the total errors for the detection window, as described hereinabove.

If, however, decision 33 determines that the current value S for the current sample period exceeds the average value AVG, process 38 is performed in which the value S is set to the sum of the average value AVG plus the carryover value. This operation of process 38 thus allows counting of the carryover value from the prior sample period, while reducing the value S so as not to unfairly inflate the total error count due to the inclusion of the carryover value from the prior sample period. Process 40 is then performed to set the carryover value for the next sample period, by subtracting the average value AVG from the value L (i.e., the raw value S for the current sample period) to arrive at the carryover value. Control then passes to process 16 (FIG. 2) for determination of the total errors in the detection window, as discussed above.

Referring back to decision 31, if the sum of the value S for the current sample period and the carryover value from the prior sample period meets or exceeds the burst error threshold B, an errored condition that is at least as errored as a burst condition is present in the current sample period. Since this sum is comprised of error counts from two sample periods, the burst condition may have begun either in the prior sample period or in the current sample period. According to this embodiment of the invention, the method determines in which sample period the error burst is considered to have begun by way of decision 41, in which the carryover value from the prior sample period is compared against a constant K. If the carryover value meets or exceeds constant K, the burst is considered to have begun in the prior sample period, and control passes to process 42; if the carryover value is below the constant K, the burst is considered to have begun in the current sample period, and control passes to process 43.

Figure 5:
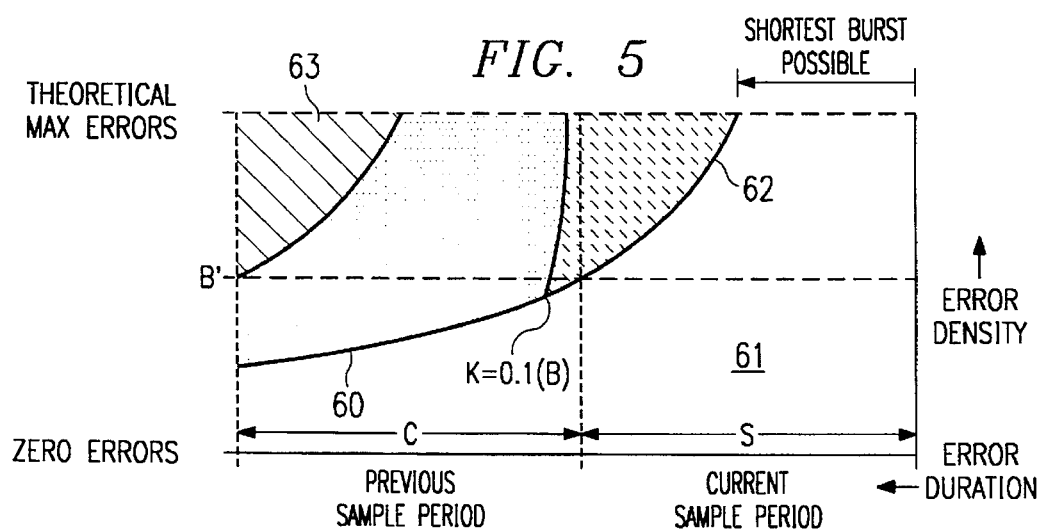
FIG. 5 is a plot of error ratio versus time illustrating the portion of the method of FIG. 3 in which the sample period in which the burst event is considered to have begun is determined, according to the preferred embodiment of the invention.

The value of constant K is selected to be a fraction of the burst error threshold B that provides the best performance for the particular communications environment. FIG. 5 is a plot of error density versus error duration, illustrating a current sample period and a prior sample period, and the respective associated values of S and carryover (C) that will cause a burst condition to be detected during the performing of process 20 for the current sample period. The constant K is selected to be of the value 0.1 times burst error threshold B, in this example. It is contemplated that the constant K may require adjustment, depending upon the particular installation.

Regions 60 and 62 cumulatively indicate those points on the plot of FIG. 5 in which a burst will be detected in the current sample period of this example; region 61 contains those points in which the current sample period errors are too low to cause a burst, while region 63 indicates those points in which a burst condition would have necessarily been detected in the previous sample period. Region 60 indicates those points in which the carryover value C meets or exceeds the constant K, and in which decision 41 (of FIG. 3) would designate the previous sample period to be the beginning of the burst condition. Region 62 indicates those points in which a burst condition is detected in the current sample period, and in which the carryover value C is below the constant K; as a result, for errored conditions corresponding to region 62 (including those points corresponding to bursts that in fact began in the previous sample period), decision 41 would indicate that the burst began in the current sample. It should be noted that the running average error rate AVG for the detection window prior to the current detection window is assumed to be zero, for purposes of FIG. 5.

Processes 42, 43 set an index value N to a negative value depending upon the value of counter G which indicates the number of successive sample periods for which burst suppression is to be performed, and depending upon whether the burst condition is considered to have begun in the current or the previous sample period. Where the burst is considered to have begun in the prior sample period, process 42 sets the index N to the value 1−G; conversely, if the burst is considered to have begun in the current sample period, process 43 sets the index N to the value 0−G. As a result, the index N is less negative by one in the event that the previous sample period contains the beginning of the burst condition. In either case, control passes to process 44.

Because of the detection of a possible burst condition in the current sample period (as determined by decision 31), process 44 modifies the error value S for the current sample period by setting it equal to the running average AVG error rate from the prior sampling periods within the detection window (prior to incorporating the current sample period into the detection window). Accordingly, the value S for the current sampling period is likely to be significantly reduced, considering that if the running average error rate was high enough to effect protection switching, this switching would have taken place in the prior sampling period (in process 16 therein). Process 46 is then performed, in which the last sample value L is set to the running average error rate AVG. The carryover value is then zeroed in process 48, since a burst condition has already been detected. Control of the operation then passes to process 16 described hereinabove, in which the modified S value for the current sample period is used in the calculation of the total errors T in the new detection window, and thus in the comparison of the total errors to the error threshold E.

Once a burst condition has been detected, and process 16 performed for the current sample period, the process of FIG. 2 is repeated for the next sampling period. Upon entering process 20 in the next sampling period, however, decision 27 will, in its comparison of the index value N to the detection window size value P, determine that a burst has already been detected for a sampling period currently within the detection window. Process 50 is then performed in which index N is incremented.

Decision 51 determines whether the index value is still negative, in which case burst suppression is still in effect (i.e., the now-current sampling period is within the next G sampling periods after the sampling period in which the burst condition is considered to have begun). According to the preferred embodiment of the invention, multiple sampling period burst suppression is performed by modifying the S value for each sampling period within the G successive sampling periods after a burst has begun.; in this example of the invention, the modified S value corresponds to the running average value AVG for the detection window prior to the sampling period in which the burst is considered to have begun. As shown in FIG. 3, if decision 51 indicates that index value N is negative (i.e., the now-current sampling period is within the burst suppression sequence), process 52 is performed in which the S value for the now-current sampling period is set to the running average AVG prior to performing process 16. On the other hand, if the index N is not negative at this time, the now-current sampling period is outside of the burst suppression sequence, and the value S is maintained at its raw value for computation of the total error count T in process 16.

Accordingly, the present invention provides the important advantage that burst conditions may be detected by a network element such as FOT 2d, and suppressed from greatly affecting the protection switching decision by way of modifying the number of errors for a sampling period downwardly to match the current running average error rate. Accordingly, it is contemplated that premature protection switching, due to short burst conditions, will be substantially avoided by the present invention.

Figure 6:
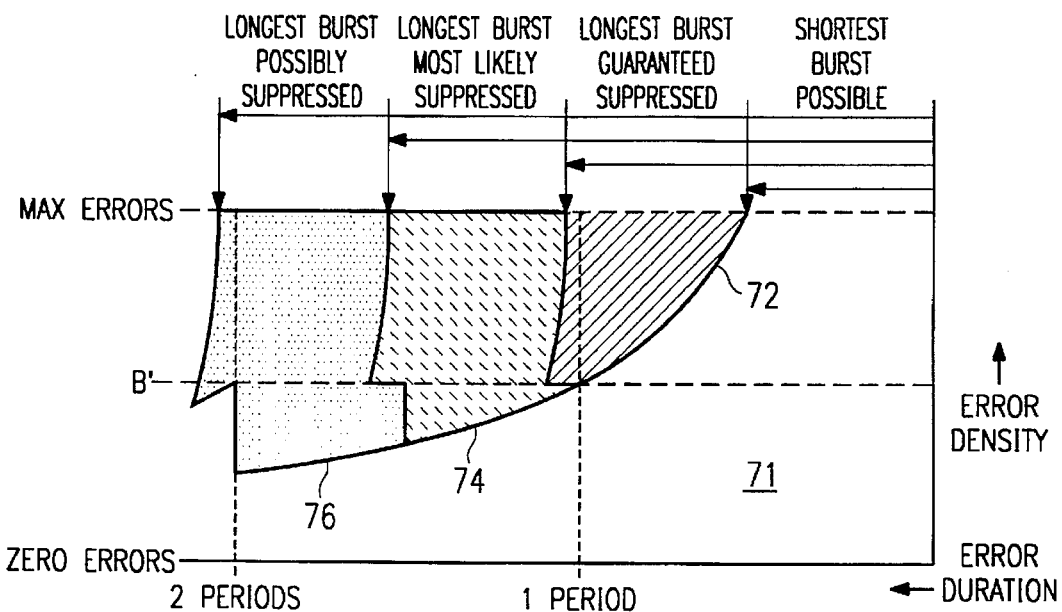
FIG. 6 is a plot of error ratio versus time illustrating the qualitative effect of burst suppression according to the preferred embodiment of the invention.

FIG. 6 qualitatively illustrates the performance of the method according to the preferred embodiment of the invention, in the case where G, the number of sample periods for which bursts are to be suppressed, equals one, and in which the running average error rate AVG prior to the two illustrated sample periods equals zero. Region 71, as before, are those points in which too few errors have occurred to indicate a burst condition. Region 72 indicates those points for which a burst condition will surely be detected and suppressed according to the preferred embodiment of the invention. Region 74 indicates those points for which the probability of detection and suppression of a burst condition is between 50% and 100%, and thus in which a burst will likely be detected and suppressed. The boundary between regions 72 and 74 depends upon the value of the constant K discussed hereinabove. Region 76 indicates those points for which the probability of detection and suppression of a burst condition is possible, but low (i.e. between 0% and 50%). As indicated by the plot of FIG. 6, the present invention can be quite effective in detecting and suppressing a large number of burst conditions, and thus in eliminating many types of error conditions from effecting protection switching when not warranted.

Figure 7A:
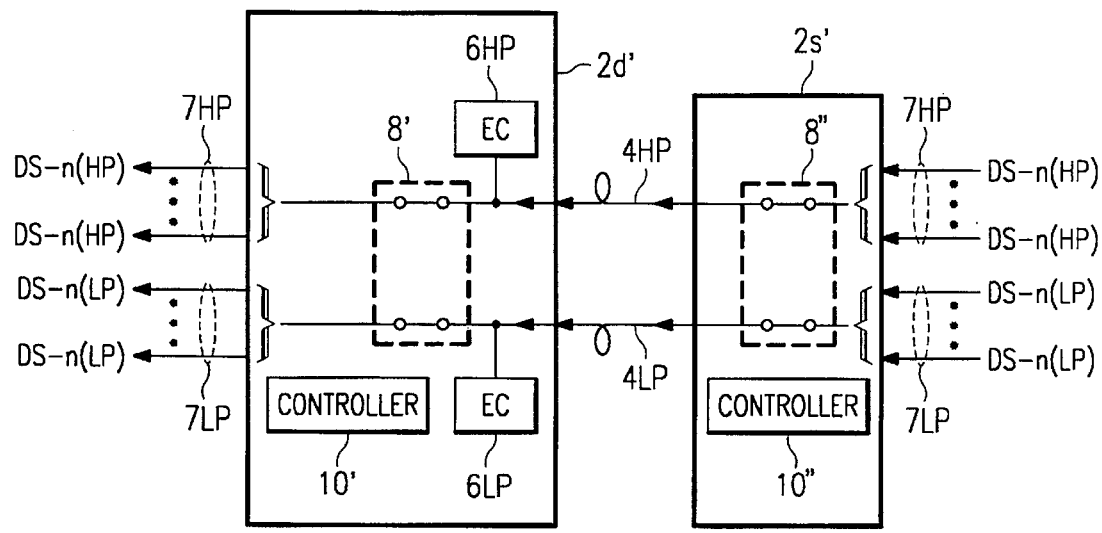
FIGS. 7a and 7b schematically illustrate the construction and operation of a portion of a "1:1" digital communications network in which a network element (NE) according to the preferred embodiment of the invention is implemented.
Figure 7B:
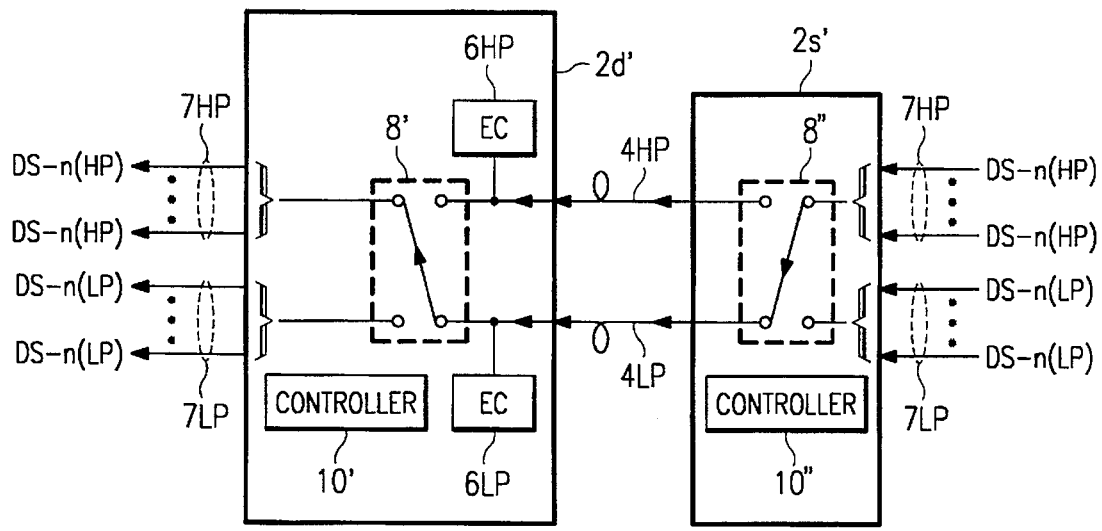

Referring now to FIGS. 7a and 7b, another protection switching scheme with which the preferred embodiment of the invention may also be used is illustrated. FIG. 7a illustrates the initial, pre-switch, condition of a portion of a network configured according to the well-known 1:1 (or "one-for-one") protection scheme. As in the case of FIGS. 1a and 1b, traffic is being transmitted unidirectionally from FOT 2s' to FOT 2d'. In the 1:1 configuration, FOT 2s' receives two types of traffic, with high priority traffic presented thereto on coaxial DS-n lines 7HP and with low priority traffic presented thereto on coaxial DS-n lines 7LP. Switch 8" in FOT 2s', under the control of programmable controller 10", effectively connects high priority DS-n lines 7HP to fiber optic cable 4HP, and connects low priority DS-n lines 7LP to fiber optic cable 4LP. In this configuration, the traffic borne by high priority fiber optic line 4HP is different from that borne by low priority fiber optic line 4LP. As such, the capacity of traffic carried by the system of FIG. 7a is twice that carried by the system of FIG. 1a; as will be apparent below, however, this doubling of capacity in a non-failure condition is obtained only by allowing the low priority traffic to be displaced from the network in the event protection switching is effected.

On the destination side, FOT 2d' receives traffic from both of fiber optic lines 4HP, 4LP, with the bit errors monitored thereat by error counters 6HP, 6LP (of similar construction as error counters 6E, 6W noted above). In this embodiment of the invention, in the condition prior to effecting protection switching, both the low priority traffic on fiber optic line 4LP and the high priority traffic on fiber optic line 4HP are transmitted and forwarded to the appropriate destination coaxial lines 7LP, 7HP, respectively.

In the event that a failure condition is detected on the high priority traffic as received at FOT 2d' controllers 10' and 10" will communicate with one another to perform protection switching both at the source FOT 2s' and at the destination FOT 2d'. In this case, controller 10' in FOT 2d' causes switch 8' to switch the incoming traffic on fiber optic line 4LP to coaxial lines 7HP, while controller 10" in FOT 2s' causes switch 8" to approximately simultaneously switch the incoming traffic on coaxial lines 7HP to fiber optic line 4LP. The result of this double switching operation is illustrated in FIG. 7b, in which the high priority traffic is routed from FOT 2s' to FOT 2d' via fiber optic line 4LP. In this case, the low priority traffic previously carried on fiber optic line 4LP is not transmitted, and thus must wait for the completion of the high priority transmission prior to its transmission.

It is contemplated that one may readily see that it is especially desirable to avoid mistaken protection switching in the case of 1:1 protection, since the volume of communicated data is reduced after protection switching is effected. As such, controller 10' programmed to perform the error burst detection and suppression will not only reduce the duration of errored conditions in the 1:1 protection scheme, but will also increase the overall throughput of the system since the times in which the low priority traffic is precluded from transmission will be reduced.

Other protection switching operations, such as described in the above-referenced U.S. Pat. No. 5,329,520, may also utilize the present invention in determining whether the bit error ratio of received traffic (i.e., the "soft" error ratio as referred to in U.S. Pat. No. 5,329,520), is high enough to require protection switching.

While the invention has been described herein relative to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A method of controlling protection switching at a receiving network element in a communications network, comprising the steps of:

detecting a number of bit errors in digital communications traffic received by the network element on a first communications line over a plurality of sample periods;

for a first sample period, comparing an error value, corresponding to the number of detected bit errors in the sample period, to a burst error threshold;

responsive to said comparing step determining that the error value for the first sample period exceeds the burst error threshold, setting a value S stored at a memory location to a reduced error value;

responsive to said comparing step determining that error value for the first sample period does not exceed the burst error threshold, maintaining the value S stored at the memory location at a value corresponding to the error value;

after said setting step or said maintaining step, adding the value S for the first sample period to a sum of values S corresponding to a selected number of preceding sample periods;

comparing the result of the adding step to an error threshold; and responsive to the comparing step determining that the result of the adding step exceeds the error threshold, switching the network element to receive communications traffic from a second communications line.

2. The method of claim 1, wherein said step of setting the value S stored at a memory location comprises:

calculating an average error rate over a selected number of sample periods preceding the first sample period; and setting the value S stored at the memory location to the calculated average error rate.

3. The method of claim 1, further comprising:

calculating an average error rate over a selected number of sample periods preceding the first sample period;

responsive to said comparing step determining that the error value of the first sample period does not exceed the burst error threshold, comparing the error value of the first sample period to the average error rate; and responsive to the error value of the first sample period exceeding the average error rate, setting a carryover value for the first sample period to correspond to the difference between the error value of the first sample period and the average error rate.

4. The method of claim 3, further comprising:

for a second sample period, calculating the error value by adding a carryover value from the first sample period to the number of detected errors for the second sample period;

after the calculating step, comparing the calculated error value to the burst error threshold;

responsive to said comparing step determining that the error value for the second sample period exceeds the burst error threshold, setting the value S for the second sample period to a reduced error value;

responsive to said comparing step determining that error value for the first sample period does not exceed the burst error threshold, maintaining the value S for the second sample period at a value corresponding to the error value;

after said setting step or said maintaining step, adding the value S for the second sample period to a sum of the values S corresponding to a selected number of preceding sample periods;

comparing the result of the adding step to an error threshold; and responsive to the comparing step determining that the result of the adding step exceeds the error threshold, switching the network element to receive communications traffic from a second communications line.

5. The method of claim 3, further comprising:

responsive to the comparing step determining that the error value for the first sample period exceeds the burst error threshold, setting a carryover value for the first sample period to zero.

6. The method of claim 1, further comprising the steps of:

responsive to the first comparing step determining that the error value for the first sample period exceeds the burst error threshold and responsive to the second comparing step determining that the result of the adding step does not exceed the error threshold, setting a first index value to a value corresponding to the number of sample periods for which burst suppression is to take place;

detecting the number of bit errors in digital communications traffic received by the network element on a first communications line over a second sample period following the first sample period;

comparing the first index value to a burst suppression limit;

responsive to the first index value not having reached the burst suppression limit, setting the value S for the second sample period to a reduced error value;

incrementally modifying the first index value;

adding the value S for the second sample period to the sum of the values S corresponding to the selected number of preceding sample periods;

comparing the result of the adding step to the error threshold; and responsive to the comparing step determining that the result of the adding step exceeds the error threshold, switching the network element to receive communications traffic from a second communications line.

7. The method of claim 6, further comprising:

prior to detecting the number of bit errors in digital communications traffic received by the network element on a first communications line over a second sample period following the first sample period, determining if one of the plurality of sample periods had an error value which exceeded the burst error threshold.

8. The method of claim 1, wherein the communications network is of a 1+1 protection type;

and wherein the method of claim 1 further comprises the step of:

providing the same digital communications traffic from a sending network element to the receiving network element over the first and second communications lines.

9. The method of claim 1, wherein the communications network is of a 1:1 protection type;

and wherein the method of claim 1 further comprises the steps of:

providing high priority digital communications traffic from a sending network element to the receiving network element over the first communications line;

providing low priority digital communications traffic from the sending network element to the receiving network element over the second communications line; and responsive to the comparing step determining that the result of the adding step exceeds the error threshold, switching the sending network element to provide the high priority digital communications traffic onto the second communications line.

10. A communications system having protection switching, comprising:

first and second communications lines, onto which communications traffic is provided by a sending network element; and a receiving network element, having first and second inputs coupled to the first and second communications lines, having an output, and comprising:

a switch for switching the output to present communications traffic received at either the first or the second inputs of the receiving network element;

a first error counter, coupled to the first input of the receiving network element, for detecting and counting a number of bit errors received from said first communications line; and a controller for controlling said switch, said controller programmed in such a manner that:

the first error counter is periodically interrogated to determine the number of detected bit errors over a plurality of sample periods;

an error value corresponding to the number of detected bit errors in a first sample period is compared to a burst error threshold;

a value S stored at a memory location for the first sample period is set to reduced error value responsive to the error value for the first sample period exceeding the burst error threshold, while the value S is maintained at the error value for the first sample period responsive to the error value for the first sample period not exceeding the burst error threshold; and for switching the network element to receive communications traffic from a second communications line responsive to a sum of the value S for the first sample period and values S corresponding to a selected number of preceding sample periods exceeding an error threshold.

11. The system of claim 10, wherein the controller is programmed to set the value S stored at the memory location to a reduced value for a first sample period by:

calculating an average error rate over a selected number of sample periods preceding the first sample period; and setting the value S for the first sample period to the calculated average error rate.

12. The system of claim 10, wherein the controller is also programmed for:

calculating an average error rate over a selected number of sample periods preceding the first sample period;

responsive to the error value of the first sample period exceeding the average error rate but not exceeding the burst error threshold, setting a carryover value for the first sample period to correspond to the difference between the error value of the first sample period and the average error rate.

13. The system of claim 12, wherein the controller is also programmed for:

calculating the error value by adding the carryover value from the first sample period to the number of detected bit errors for a second sample period;

responsive to the calculated error value exceeding the burst error threshold, setting the value S for the second sample period to a reduced error value;

responsive to the calculated error value not exceeding the burst error threshold, maintaining the value S for the second sample period at a value corresponding to the error value;

adding the value S for the second sample period to values S corresponding to a selected number of preceding sample periods to result in a total error value;

and, responsive to the total error value exceeding the error threshold, switching the network element to receive communications traffic from the second communications line.

14. The system of claim 10, wherein the communications network is of a 1+1 protection type;

and wherein the system of claim 10 further comprises:

a sending network element for transmitting the same traffic to the receiving network element over both the first and second communications lines.

15. The system of claim 10, wherein the communications network is of a 1:1 protection type;

and wherein the system of claim 10 further comprises:

a sending network element for transmitting high priority communications traffic to the receiving network element over the first communications line, and for transmitting low priority communications traffic to the receiving network element over the second communications line, said sending network element comprising:

a switch for selectively coupling high priority and low priority inputs to the first and second communications lines;

a controller, for controlling the switch to connect the high priority input to the second communications line responsive to a switch signal from the receiving network element;

and wherein the controller of the receiving network element is also for sending the switch signal to the sending network element responsive to a sum of the values S for the first sample period with the values S corresponding to a selected number of preceding sample periods exceeding an error threshold.

* * * * *